(12) United States Patent
Mochizuki et al.

(10) Patent No.: US 11,697,616 B2
(45) Date of Patent: Jul. 11, 2023

(54) RADIATION POLYMERIZABLE COMPOSITION, CURED LAYER OF SAME, OPTICAL FIBER CONTAINING CURED LAYER AND METHOD FOR PRODUCING SAME

(71) Applicant: Japan Fine Coatings Co., Ltd., Ibaraki (JP)

(72) Inventors: Daigou Mochizuki, Ibaraki (JP); Takumi Nakajima, Mie (JP); Noriyasu Shinohara, Ibaraki (JP)

(73) Assignee: Japan Fine Coatings Co., Ltd., Ibaraki (JP)

( * ) Notice: Subject to any disclaimer, the term of this patent is extended or adjusted under 35 U.S.C. 154(b) by 0 days.

(21) Appl. No.: 17/791,937

(22) PCT Filed: Jan. 15, 2021

(86) PCT No.: PCT/JP2021/001263
§ 371 (c)(1),
(2) Date: Jul. 11, 2022

(87) PCT Pub. No.: WO2021/145433
PCT Pub. Date: Jul. 22, 2021

(65) Prior Publication Data
US 2023/0122926 A1    Apr. 20, 2023

(30) Foreign Application Priority Data

Jan. 16, 2020 (JP) ................. 2020-005448

(51) Int. Cl.
| | | |
|---|---|---|
| *C03C 25/326* | (2018.01) | |
| *C08G 18/76* | (2006.01) | |
| *C03C 25/104* | (2018.01) | |
| *C09D 175/16* | (2006.01) | |
| *C08F 290/06* | (2006.01) | |
| *C08F 222/06* | (2006.01) | |
| *C08F 222/40* | (2006.01) | |
| *C08G 18/67* | (2006.01) | |
| *C08G 18/04* | (2006.01) | |
| *C03C 25/28* | (2018.01) | |

(52) U.S. Cl.
CPC .......... *C03C 25/326* (2013.01); *C03C 25/104* (2013.01); *C03C 25/28* (2013.01); *C08F 222/06* (2013.01); *C08F 222/40* (2013.01); *C08F 290/067* (2013.01); *C08G 18/04* (2013.01); *C08G 18/6715* (2013.01); *C08G 18/76* (2013.01); *C09D 175/16* (2013.01)

(58) Field of Classification Search
CPC .......... C08L 75/14; C08L 51/08; C08L 75/16; C08F 283/006; C08F 290/067; C08F 290/147; C08F 22/06; C08F 22/40; C08F 222/06; C08F 222/40–408; C08G 18/04; C08G 18/6715; C08G 18/8108; C08G 18/8125; C09D 151/08; C09D 175/14; C09D 175/16; C03C 25/26; C03C 25/28; C03C 25/104; C03C 25/326
See application file for complete search history.

(56) References Cited

U.S. PATENT DOCUMENTS

| | | | | |
|---|---|---|---|---|
| 2005/0170285 | A1* | 8/2005 | Sugasaki | ................. G03F 7/035 430/286.1 |
| 2019/0218404 | A1* | 7/2019 | Zhou | .................... C09D 175/16 |

FOREIGN PATENT DOCUMENTS

| | | |
|---|---|---|
| JP | H08134156 A | 5/1996 |
| JP | 2012111674 A | 6/2012 |
| JP | 2018058712 A | 4/2018 |
| WO | 2008069656 A1 | 6/2008 |
| WO | 2019026356 A1 | 2/2019 |
| WO | 2019138968 A1 | 7/2019 |

OTHER PUBLICATIONS

International Search Report PCT/JP2021/001263, dated Mar. 16, 2021.

* cited by examiner

*Primary Examiner* — Kregg T Brooks
(74) *Attorney, Agent, or Firm* — Donald R. Palladino

(57) ABSTRACT

[Problem] To provide a radiation curable resin composition which is suitable as a primary material for optical fibers, while having a high curing rate by means of irradiation of radiation [Solution] A radiation polymerizable composition for forming an optical fiber primary coating layer, said composition containing: (A) a urethane oligomer containing a structure represented by formula (I) (in formula (I), R represents a vinyl group; and * represents a bonding hand); (B) one or more compounds selected from among (i) maleic acid anhydride, (ii) a compound represented by formula (II) (in formula (II), $R^1$ represents a single bond or an alkanediyl group having from 1 to 6 carbon atoms; and $R^2$ represents a hydrogen atom, a hydroxy group or a specific group represented by formula (II-1) or formula (II-2)), and (iii) a compound represented by formula (III) (in formula (III), $R^5$ represents an alkanediyl group having from 1 to 6 carbon atoms); and (C) a radiation polymerization initiator.

17 Claims, No Drawings

RADIATION POLYMERIZABLE COMPOSITION, CURED LAYER OF SAME, OPTICAL FIBER CONTAINING CURED LAYER AND METHOD FOR PRODUCING SAME

CROSS-REFERENCE TO RELATED APPLICATION

This application is a national stage application under 35 U.S.C. § 371 of PCT/JP2021/001263, filed Jan. 15, 2021, which claims the benefit of Japanese Application No. 2020-005448, filed Jan. 16, 2020, each of which is incorporated herein by reference.

TECHNICAL FIELD

The present invention relates to a resin composition that is suitable as an optical fiber coating material, particularly as a primary material of an optical fiber, and has a fast curing rate by irradiation with radiation.

BACKGROUND ART

An optical fiber is produced by coating a glass fiber, which has been obtained by thermal melt-spinning of glass, with a resin for the purpose of protection and reinforcement. As such a resin coating, a structure obtained by providing a soft first coating layer (hereinafter also referred to as a "primary coating layer") on the surface of the glass fiber and, on the outside thereof, providing a high-rigidity second coating layer (hereinafter also referred to as a "secondary coating layer") is known. An optical fiber having a structure in which a primary coating layer and a secondary coating layer are provided on a single glass fiber is normally known as an optical fiber strand, and an optical fiber strand may further have a colored ink layer or an up-jacket layer on the outside of the secondary coating layer. Furthermore, tape-shaped optical fibers and optical fiber cables in which a plurality of such optical fiber strands provided with resin coatings are fixed together with a binding material are also well known.

A resin composition for forming a first coating layer of an optical fiber strand is called a primary material, a resin composition for forming a second coating layer is called a secondary material, and a resin composition that is used as a binding material for a plurality of optical fiber strands is called a bundling material. Additionally, there are also cases in which a plurality of tape-shaped optical fibers and optical fiber cables are further bound together by a binding material, and the binding material used in such cases is also called a bundling material. As resin coating methods in the above cases, methods in which a liquid curable resin composition is applied and then cured by means of heat or light, particularly ultraviolet rays, are widely used.

Of these coating materials, the cured product of the primary material must be flexible in order to prevent the glass fiber from being bent or the like due to localized pressure from the outside. For this reason, primary coating layers normally have a Young's modulus of 1 to 10 MPa.

JP 2012-111674 A discloses, as a resin composition that is suitable as a primary material of an optical fiber strand, a radiation curable resin composition comprising a urethane oligomer and a monofunctional acrylic monomer.

SUMMARY OF INVENTION

Since radiation curable resin compositions have a faster curing rate than thermosetting resins, optical fibers can be produced with high productivity. However, in order to further improve productivity, radiation curable resin compositions with a faster curing rate are desired.

One object of the present invention is to provide a radiation curable resin composition that is suitable as a primary material of an optical fiber and has a faster curing rate by irradiation with radiation than that of conventional compositions.

One object of the present invention is to provide a cured layer of the radiation curable resin composition.

One object of the present invention is to provide an optical fiber comprising the cured layer and a production method therefor.

One aspect of the present invention is a radiation polymerizable composition for forming a primary coating layer of an optical fiber, the radiation polymerizable composition comprising:

(A) a urethane oligomer comprising a structure represented by formula (I) below:

wherein R is a vinyl group and * is a bond;

(B) one or more compounds of:
  (i) maleic anhydride;
  (ii) a compound represented by formula (II) below:

wherein $R^1$ is a single bond or an alkanediyl group comprising 1 to 6 carbon atoms, and $R^2$ is a hydrogen atom, a hydroxy group, or a group represented by formula (II-1) or formula (II-2) below:

wherein $R^3$ is a hydrogen atom, an amino group, a carboxy group, a hydroxy group, an alkyl group, or an alkoxy group, and * is a bond, and

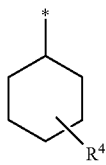

(II-2)

wherein R⁴ is a hydrogen atom, an amino group, a carboxy group, a hydroxy group, an alkyl group, or an alkoxy group, and * is a bond; or (iii) a compound represented by formula (III) below:

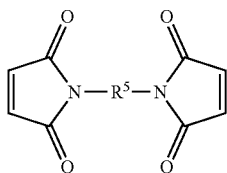

(III)

wherein R⁵ is an alkanediyl group comprising 1 to 6 carbon atoms; and (C) a radiation polymerization initiator.

Another aspect of the present invention is a cured layer of a radiation polymerizable composition.

Another aspect of the present invention is an optical fiber comprising a cured layer of a radiation polymerizable composition and an assembly thereof.

Another aspect of the present invention is a method for producing an optical fiber comprising a primary coating layer, comprising: disposing a radiation polymerizable composition on at least part of a surface of a glass fiber; and curing the radiation polymerizable composition by radiation irradiation.

DESCRIPTION OF EMBODIMENTS

Hereinafter, one embodiment of the present invention will be described in detail. The present invention is not limited to the following embodiment and can be carried out with modifications as appropriate so long as the effects of the invention are not inhibited.

The radiation polymerizable composition of the present embodiment is a radiation polymerizable composition for forming a primary coating layer of an optical fiber, comprising: (A) a urethane oligomer comprising a predetermined structure; (B) one or more compounds selected from maleic anhydride and compounds represented by predetermined formulas; and (C) a radiation polymerization initiator.

In one preferred embodiment, the present composition further comprises a compound having one or more ethylenically unsaturated groups other than the above-mentioned component (A) as component (D).

Herein, the expression "radiation polymerizable composition" is understood to refer to a composition that is cured by a polymerization reaction induced by irradiation with radiation. Examples of radiation include infrared rays, visible light rays, ultraviolet rays, X-rays, electron beams, α-rays, β-rays, and γ-rays, with ultraviolet rays being particularly preferred.

The expression "primary coating layer of an optical fiber" is understood to refer to a coating layer, among the coating layers provided on a glass fiber, that is disposed at the position closest to the glass fiber. The primary coating layer may be provided so as to cover at least part of the glass fiber surface. The expression "for forming a primary coating layer of an optical fiber" is understood to refer to being able to be used to form a primary coating layer of an optical fiber, or being for the purpose of forming a primary coating layer of an optical fiber.

The expression "urethane oligomer" is understood to refer to an oligomer comprising a urethane bond (—NHCOO—) in the repeat units in the main chain. Urethane bonds can generally be formed by inducing a reaction between a diol and a diisocyanate. The diols and diisocyanates that are usable will be explained below.

The urethane oligomer (A) comprises the structure represented by formula (I) below:

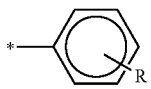

(I)

wherein R is a vinyl group and * is a bond.

The expression "comprising a structure" is understood to refer to the urethane oligomer comprising, in the structure thereof, at least one structure represented by the above-mentioned formula (I). The urethane oligomer preferably comprises the structure represented by formula (I) at at least one terminal of the main chain.

It is possible for * to bond to various atoms. Preferably, * bonds to an oxygen atom (—O—) via an alkanediyl group or not via an alkanediyl group. The structure represented by formula (I) can preferably bond to the main chain of the urethane oligomer (preferably a structural unit derived from a diisocyanate constituting the urethane oligomer) via the bond with the oxygen atom (—O—).

Examples of alkanediyl groups include alkanediyl groups comprising 1 to 6 carbon atoms (having 1 to 6 carbon atoms). Since alkanediyl groups comprising 1 to 6 carbon atoms are the same as those mentioned in formula (I-1) explained below, the descriptions thereof are omitted here.

The urethane oligomer (A) preferably comprises the structure represented by formula (I) as part of the structure of formula (I-1) below:

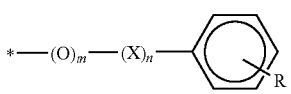

(I-1)

wherein R is a vinyl group, X is an alkanediyl group comprising 1 to 6 carbon atoms (having 1 to 6 carbon atoms), n is an integer of 0 or 1, m is an integer of 0 or 1, and * is a bond; * bonds to the main chain of a urethane oligomer; * preferably forms a urethane bond with a structural unit derived from a diisocyanate constituting the urethane oligomer; n is preferably 1 from the viewpoint of ease of bonding to the main chain of the urethane oligomer; and m is preferably 1.

Examples of alkanediyl groups having 1 to 6 carbon atoms include a methane-1,1-diyl group, an ethane-1,1-diyl group, an ethane-1,2-diyl group, a propane-1,1-diyl group, a propane-1,2-diyl group, a propane-1,3-diyl group, a propane-2,2-diyl group, a butane-1,2-diyl group, a butane-1,3-diyl group, a butane-1,4-diyl group, a butane-2,2-diyl group, a pentane-1,4-diyl group, a pentane-1,5-diyl group, a hexane-1,5-diyl group, and a hexane-1,6-diyl group. The number of carbon atoms of the alkanediyl group is preferably 1 to 5, and more preferably 1 to 3.

The alkanediyl group having 1 to 6 carbon atoms is even more preferably a methane-1,1-diyl group, an ethane-1,1-diyl group, an ethane-1,2-diyl group, a propane-1,1-diyl group, a propane-1,2-diyl group, a propane-1,3-diyl group, or a propane-2,2-diyl group, and is particularly preferably a methane-1,1-diyl group.

Examples of substituents satisfying the structure represented by formula (I-1) include a 2-vinylphenoxy group, a 3-vinylphenoxy group, a 4-vinylphenoxy group, a 3-vinylbenzyloxy group, a 4-vinylbenzyloxy group, a 3-vinylphenethyloxy group, a 4-vinylphenethyloxy group, a 3-vinylphenyl-1-propoxy group, a 3-vinylphenyl-2-propoxy group, a 4-vinylphenyl-1-propoxy group, and a 4-vinylphenyl-2-propoxy group.

In one embodiment, the urethane oligomer (A) preferably comprises one or more substituents selected from the group consisting of a 2-vinylphenoxy group, a 3-vinylphenoxy group, a 4-vinylphenoxy group, a 3-vinylbenzyloxy group, and a 4-vinylbenzyloxy group, and more preferably comprises one or more substituents selected from a 3-vinylbenzyloxy group and a 4-vinylbenzyloxy group.

The urethane oligomer (A) preferably has the structure represented by formula (I) at at least one terminal of the main chain, and more preferably comprises a urethane oligomer having the structure represented by formula (I) at both terminals of the main chain. By comprising a urethane oligomer having the structure represented by formula (I) at both terminals of the main chain, the curing rate by irradiation with radiation can be improved more easily.

In one embodiment, the urethane oligomer (A) comprises a urethane oligomer (A-1) having the structure represented by formula (I) at both terminals of the main chain and a urethane oligomer (A-2) having the structure represented by formula (I) at one terminal of the main chain and an aliphatic alkoxy group having 1 to 10 carbon atoms at the other terminal. Comprising a urethane oligomer (A-1) having the structure represented by formula (I) at both terminals of the main chain and a urethane oligomer (A-2) having the structure represented by formula (I) at one terminal of the main chain and an aliphatic alkoxy group having 1 to 10 carbon atoms at the other terminal facilitates adjustment of the Young's modulus while further improving the curing rate by irradiation with radiation.

Examples of aliphatic alkoxy groups having 1 to 10 carbon atoms that the urethane oligomer (A-2) can have at the other terminal include a methoxy group, an ethoxy group, a 1-propoxy group, a 2-propoxy group, a 1-butoxy group, a 2-butoxy group, a t-butoxy group, a pentyloxy group, a hexyloxy group, a heptyloxy group, a 2-ethyl-1-hexyloxy group, an octyloxy group, and a decyloxy group. The urethane oligomer (A-2) can comprise substituents selected from these groups. The urethane oligomer (A) may comprise a plurality of types of urethane oligomers (A-2) with different terminal structures.

Among these, the urethane oligomer (A-2) more preferably includes a functional group selected from a methoxy group, an ethoxy group, a 1-propoxy group, a 2-propoxy group, and a 2-ethyl-1-hexyloxy group, and even more preferably comprises a functional group selected from a methoxy group and a 2-ethyl-1-hexyloxy group.

The diol forming the urethane bond in the urethane oligomer (A) is not particularly limited, but is preferably an aliphatic polyether diol. For example, polyethylene glycol, polypropylene glycol, polytetramethylene glycol, polyhexamethylene glycol, polyheptamethylene glycol, polydecamethylene glycol, aliphatic polyether diols obtained by ring-opening copolymerization of two or more types of ion-polymerizable cyclic compounds, and the like are preferred.

Examples of the above-mentioned ion-polymerizable cyclic compounds include cyclic ethers such as ethylene oxide, propylene oxide, butene-1-oxide, isobutene oxide, 3,3-bis-chloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether, and benzoic acid glycidyl ester.

Specific examples of polyether diols obtained by ring-opening copolymerization of two or more types of the above-mentioned ion-polymerizable cyclic compounds include binary copolymers obtained by combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, and butene-1-oxide and ethylene oxide; and ternary polymers obtained by a combination of tetrahydrofuran, butene-1-oxide, and ethylene oxide.

Additionally, polyether diols obtained by ring-opening copolymerization of the above-mentioned ion-polymerizable cyclic compounds with cyclic imines such as ethyleneimine, with cyclic lactonic acids such as β-propiolactone or glycolic acid lactide, or with dimethylcyclopolysiloxanes may also be used.

The above-mentioned aliphatic polyether diols may, for example, be obtained as commercially available products such as PTMG650, PTMG1000, and PTMG2000 (the above manufactured by Mitsubishi Chemical Corp.); PPG400, PPG1000, PPG3000, and EXCENOL 720, 1020, and 2020 (the above manufactured by AGC Inc.); PEG1000, Unisafe DC1100, and DC1800 (the above manufactured by NOF CORPORATION); PPTG2000, PPTG1000, PTG400, and PTGL2000 (the above manufactured by Hodogaya Chemical Co., Ltd.); Z-3001-4, Z-3001-5, PBG2000A, PBG2000B, EO/BO4000, and EO/B02000 (the above manufactured by DKS Co., Ltd.); and Acclaim 2200, 2220, 3201, 3205, 4200, 4220, 8200, and 12000 (the above manufactured by Sumitomo Bayer Urethane Co., Ltd.).

Among these aliphatic polyether diols, a diol that is a ring-opened polymer of one or more types of ion-polymerizable cyclic compounds having 2 to 4 carbon atoms and that has an average molecular weight of 1,000 to 5,000 is preferably used from the standpoint of achieving both high-speed applicability of the resin liquid and flexibility of the coating material. Examples of such preferable diol compounds include ring-opened polymers of one or more oxides selected from ethylene oxide, propylene oxide, butene-1-oxide, and isobutene oxide, having an average molecular weight of 1,000 to 4,000. A ring-opened polymer of propylene oxide having an average molecular weight of 1,000 to 3,000 is particularly preferred.

Examples of the diisocyanate forming the urethane bond in the urethane oligomer (A) include aromatic diisocyanates, alicyclic diisocyanates, and aliphatic diisocyanates. Examples of aromatic diisocyanates include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'- diphenylmethane diisocyanate, 3,3'-dimethylphenylene diisocyanate, 4,4'-biphenylene diisocyanate, bis(2-isocyanate ethyl) fumarate, 6-isopropyl-1,3-phenyl diisocyanate, 4-diphenylpropane diisocyanate, and tetramethylxylylene diisocyanate. Examples of alicyclic diisocyanates include isophorone diisocyanate, methylene bis(4-cyclohexyl isocyanate), hydrogenated diphenylmethane diisocyanate, hydrogenated xylylene diisocyanate, 2,5-bis(isocyanatomethyl)-bicyclo[2.2.1]heptane, and 2,6-bis(isocyanatomethyl)-bicyclo[2.2.1]heptane. Examples of aliphatic diisocyanates include 1,6-hexane diisocyanate, 2,2,4-trimethylhexamethylene diisocyanate, and lysine diisocyanate.

Among the above, aromatic diisocyanates are more preferred, and 2,4-tolylene diisocyanate and 2,6-tolylene diisocyanate are particularly preferred, from the viewpoint of economically obtaining a composition with stable quality. These diisocyanates may be used alone or in combinations of two or more types.

The content of component (A) is preferably 5% to 95% by mass relative to the total amount of the radiation polymerizable composition. When the content of component (A) is 5% to 95% by mass relative to the total amount of the radiation polymerizable composition, the curing rate by irradiation with radiation can be more easily improved. The content of component (A) is more preferably 10% to 95% by mass, even more preferably 35% to 90% by mass, and particularly preferably 50% to 85% by mass from the viewpoint of being able to more easily improve the curing rate by irradiation with radiation.

The urethane oligomer (A) is preferably synthesized by inducing a reaction between a diol component and a diisocyanate component, and thereafter inducing a reaction with a monovalent aromatic alcohol compound comprising the structure represented by formula (I).

As a result of such a reaction, preferably, a urethane oligomer having both terminals sealed with aromatic alcohol compounds comprising the structure represented by formula (I) is obtained.

In one embodiment, the urethane oligomer (A) can be synthesized by inducing a reaction between a diol component and a diisocyanate component, thereafter inducing a reaction with a monovalent aromatic alcohol compound comprising the structure represented by formula (I), and then further inducing a reaction with an aliphatic alcohol compound having 1 to 10 carbon atoms. As a result of such a reaction, preferably, a urethane oligomer having one terminal sealed with an aromatic alcohol compound comprising the structure represented by formula (I) and the other terminal sealed with an aliphatic alcohol compound having 1 to 10 carbon atoms is obtained.

Examples of monovalent aromatic alcohol compounds comprising the structure represented by formula (I) include 2-vinylphenol, 3-vinylphenol, 4-vinylphenol, 3-vinylbenzyl alcohol, 4-vinylbenzyl alcohol, 3-vinylphenethyl alcohol, 4-vinylphenethyl alcohol, 3-vinylphenyl-1-propanol, 3-vinylphenyl-2-propanol, 4-vinylphenyl-1-propanol, and 4-vinylphenyl-2-propanol. One or more compounds selected from the group consisting of these compounds can be used.

Examples of aliphatic alcohol compounds having 1 to 10 carbon atoms include monovalent aliphatic alcohols such as methanol, ethanol, 1-propanol, 2-propanol, 1-butanol, 2-butanol, 2-methylpropanol, 1-pentanol, 1-hexanol, 1-heptanol, 2-ethyl-1-hexanol, 1-octanol, and 1-decanol. Among these, it is preferable to use one or more selected from methanol, ethanol, 1-propanol, 2-propanol, and 2-ethyl-1-hexanol, and it is more preferable to use one or more selected from methanol and 2-ethyl-1-hexanol.

The used proportions of the diol, the diisocyanate, the monovalent aromatic alcohol compound comprising the structure represented by formula (I), and the optionally used aliphatic alcohol compound having 1 to 10 carbon atoms when synthesizing the urethane oligomer (A) are preferably such that, relative to 1 equivalent of hydroxyl groups included in the polyol, there are 1.1 to 3 equivalents of isocyanate groups included in the diisocyanate, 0.2 to 1.5 equivalents of the hydroxyl group of the monovalent aromatic alcohol compound comprising the structure represented by formula (I), and 0.01 to 1 equivalents of hydroxyl groups of the aliphatic alcohol having 1 to 10 carbon atoms.

In synthesis of the urethane oligomer (A), a urethanization catalyst selected from copper naphthenate, cobalt naphthenate, zinc naphthenate, dibutyltin dilaurate, dioctyltin dilaurate, triethylamine, 1,4-diazabicyclo[2.2.2]octane, 2,6,7-trimethyl-1,4-diazabicyclo[2.2.2]octane, and the like is preferably used in an amount of 0.01% to 1% by mass relative to the overall amount of the reactants. Additionally, the reaction is normally carried out at a reaction temperature of 5 to 90° C., particularly preferably at 10 to 80° C.

Component (B) comprises one or more compounds of:
(i) maleic anhydride;
(ii) a compound represented by formula (II) below:

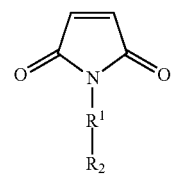

(II)

wherein $R^1$ is a single bond or an alkanediyl group comprising 1 to 6 carbon atoms, and
$R^2$ is a hydrogen atom, a hydroxy group, or a group represented by formula (II-1) or formula (II-2) below:

(II-1)

wherein $R^3$ is a hydrogen atom, an amino group, a carboxy group, a hydroxy group, an alkyl group, or an alkoxy group, and * is a bond, and

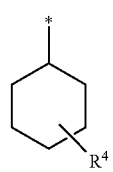

(II-2)

wherein $R^4$ is a hydrogen atom, an amino group, a carboxy group, a hydroxy group, an alkyl group, or an alkoxy group, and * is a bond; or (iii) a compound represented by formula (III) below:

(III)

wherein $R^5$ is an alkanediyl group comprising 1 to 6 carbon atoms.

In formula (II), examples of alkanediyl groups comprising 1 to 6 carbon atoms (having 1 to 6 carbon atoms) that can constitute $R^1$ include a methane-1,1-diyl group, an ethane-1,1-diyl group, an ethane-1,2-diyl group, a propane-1,1-diyl group, a propane-1,2-diyl group, a propane-1,3-diyl group, a propane-2,2-diyl group, a butane-1,2-diyl group, a butane-1,3-diyl group, a butane-1,4-diyl group, a butane-2,2-diyl group, a pentane-1,4-diyl group, a pentane-1,5-diyl group, a hexane-1,5-diyl group, and a hexane-1,6-diyl group. The number of carbon atoms of the alkanediyl group is preferably 1 to 5, and more preferably 1 to 3.

In formula (II-1) and formula (II-2), examples of alkyl groups that can constitute $R^3$ and $R^4$ each independently include alkyl groups having 1 to 6 carbon atoms. Examples of alkyl groups having 1 to 6 carbon atoms include linear or branched alkyl groups such as a methyl group, an ethyl group, an n-propyl group, an isopropyl group, an n-butyl group, a sec-butyl group, a tert-butyl group, an n-pentyl group, a 2-methy-butyl group, a 3-methy-butyl group, a 2-ethyl-propyl group, and an n-hexyl group. Examples of alkoxy groups that can constitute $R^3$ and $R^4$ each independently include alkoxy groups having 1 to 6 carbon atoms. Examples of alkoxy groups having 1 to 6 carbon atoms include linear or branched alkoxy groups such as a methoxy group, an ethoxy group, a butoxy group, and a t-butoxy group.

In both formula (II-1) and formula (II-2), * is a bond to $R^1$. When $R^1$ in formula (II) is a single bond, * in formula (II-1) and formula (II-2) is a binding site to N in formula (II).

In formula (III), $R^5$ is an alkanediyl group having 1 to 6 carbon atoms. Examples of alkanediyl groups having 1 to 6 carbon atoms include those identical to the alkanediyl groups having 1 to 6 carbon atoms that can constitute $R^1$ in formula (II).

In one embodiment, component (B) comprises a compound represented by formula (II-3) below:

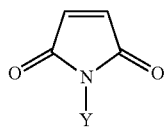
(II-3)

wherein Y is represented by one or more of the formulas below:

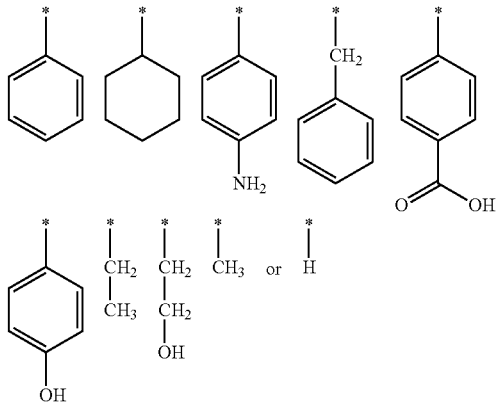

wherein * is a bond.

In one embodiment, component (B) comprises a compound represented by one of the formulas below:

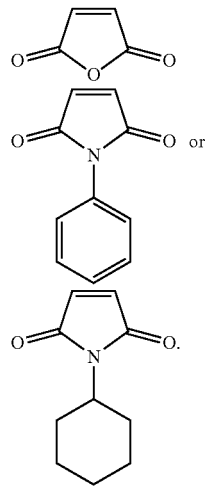

In one embodiment, component (B) comprises a compound represented by formula (II-4) below:

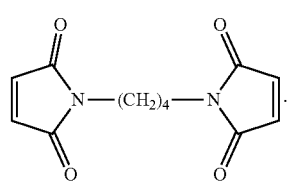
(II-4)

The content of component (B) is preferably 0.1% to 30% by mass relative to the total amount of the radiation polymerizable composition. When the content of component (B) is 0.1% to 30% by mass relative to the total amount of the radiation polymerizable composition, the curing rate by irradiation with radiation can be more easily improved. The content of component (B) is preferably 0.1% to 30% by mass, more preferably 0.5% to 25% by mass, even more preferably 0.5% to 20% by mass, and particularly preferably 1% to 15% by mass from the viewpoint of being able to more easily improve the curing rate by irradiation with radiation.

Component (C) is a radiation polymerization initiator. The expression "radiation polymerization initiator" is understood to refer to a compound that generates a radical by irradiation with radiation. Examples of the radiation polymerization initiator include 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, bis-(2,6-dimethoxybenzoyl)-2,4,4-trimethylpentylphosphine oxide; IRGACURE 184, 369, 651, 500, and 907, GI 1700, CGI 1750, CGI 1850, CG24-61, and DAROCUR 1116 and 1173 (the above manufactured by Ciba Specialty Chemicals Co., Ltd.); Lucirin TPO (manufactured by BASF); and Ubecryl P36 (manufactured by UCB).

A photosensitizer can optionally be added to the radiation polymerization initiator. Examples of the photosensitizer include triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate; and Ubecryl P102, 103, 104, and 105 (the above manufactured by UCB).

The content of component (C) is preferably 0.1% to 10% by mass relative to the total amount of the radiation polymerizable composition. When the content of component (C) is 0.1% to 10% by mass relative to the total amount of the radiation polymerizable composition, the curing by irradiation with radiation can be effectively initiated. The content of component (C) is more preferably 0.1% to 7% by mass, even more preferably 0.3% to 7% by mass, from the viewpoint of being able to effectively initiate curing by irradiation with radiation.

In one preferred embodiment, the resin composition can further comprise (D) a compound other than the above-mentioned component (A) and comprising one or more ethylenically unsaturated groups. A resin composition comprising component (D) facilitates adjustment of the Young's modulus of the cured product to be within a range that is favorable for use as a primary material (material for forming a primary coating layer) of an optical fiber.

Examples of component (D) include monofunctional acrylic monomers. Examples of monofunctional acrylic monomers include vinyl group-containing lactams such as N-vinylpyrrolidone and N-vinylcaprolactam, alicyclic structure-containing (meth)acrylates such as isobornyl (meth)acrylate, bornyl (meth)acrylate, tricyclodecanyl (meth)acrylate, dicyclopentanyl (meth)acrylate, dicyclopentenyl (meth)acrylate, and cyclohexyl (meth)acrylate, benzyl (meth)acrylate, 4-butylcyclohexyl (meth)acrylate, acryloylmorpholine, vinylimidazole, and vinylpyridine. Furthermore, examples of monofunctional acrylic monomers include phenoxyethyl (meth)acrylate, 2-hydroxyethyl (meth)acrylate, 2-hydroxypropyl (meth)acrylate, 4-hydroxybutyl acrylate, 2-ethylhexyl (meth)acrylate, stearyl (meth)acrylate, isostearyl (meth)acrylate, tetrahydrofurfuryl (meth)acrylate, polyethylene glycol mono (meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether, vinyloxyethoxyethyl (meth)acrylate, and vinyloxyethyl (meth)acrylate.

Among these components (D), the resin composition preferably comprises one or more compounds selected from phenoxyethyl (meth)acrylate, 2-ethylhexyl (meth)acrylate, N-vinylcaprolactam, isobornyl (meth)acrylate, and acryloylmorpholine from the viewpoint of the Young's modulus of the cured product.

Examples of commercially available products of component (D) include Aronix M-111, M-113, M-114, and M-117 (the above manufactured by TOAGOSEI CO., LTD.), KAYARAD TC110S, R629, and R644 (the above manufactured by Nippon Kayaku Co., Ltd.), and IBXA and Viscoat 3700 (the above manufactured by OSAKA ORGANIC CHEMICAL INDUSTRY LTD.).

The content of component (D) is preferably 3% to 45% by mass, more preferably 5% to 30% by mass, relative to the total amount of the radiation polymerizable composition.

In one embodiment, a compound comprising two or more ethylenically unsaturated groups can be blended into the radiation curable resin composition as component (E). Component (E) is typically a monomer comprising two or more ethylenically unsaturated groups. Specific examples of component (E) include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropane trioxyethyl (meth)acrylate, tris (2-hydroxyethyl)isocyanurate tri(meth)acrylate, tris(2-hydroxyethyl)isocyanurate di(meth)acrylate, tricyclodecane dimethanol di(meth)acrylate, di(meth)acrylates of diols of ethylene oxide or propylene oxide adducts of bisphenol A, di(meth)acrylates of diols of ethylene oxide or propylene oxide adducts of hydrogenated bisphenol A, epoxy (meth)acrylates obtained by adding a (meth)acrylate to diglycidyl ether of bisphenol A, and triethylene glycol divinyl ether. Additionally, examples of commercially available products include Yupimer UV SA1002 and SA2007 (the above manufactured by Mitsubishi Chemical Corp.); Viscoat 700 (manufactured by OSAKA ORGANIC CHEMICAL INDUSTRY LTD.); KAYARAD R-604, DPCA-20, -30, -60, and -10, HX-620, D-310, and D-330 (the above manufactured by Nippon Kayaku Co., Ltd.); and Aronix M-210, M-215, M-315, and M-325 (the above manufactured by TOAGOSEI CO., LTD.).

From the viewpoint of ease of adjustment of the Young's modulus of the cured product to be within a range that is favorable for use as a primary material (material for forming a primary coating layer) of an optical fiber, the content of component (E) is preferably 2% by mass or less (0% to 2% by mass) and more preferably 1.5% by mass or less (0% to 1.5% by mass) relative to the total amount of the resin composition.

In one embodiment, a silane coupling agent (F) can be blended into the radiation curable resin composition within a range that does not hinder the effects of the invention. Component (F) is not particularly limited, and it is possible to use vinyltrichlorosilane, vinyltriethoxysilane, vinyltris(R-methoxy-ethoxy)silane, β-(3,4-epoxycyclohexyl)-ethyltrimethoxyslane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyl-trimethoxysilane, γ-chloropropyltrimethoxysilane, γ-mercaptopropyltrimethoxysilane, γ-aminopropyltrimethoxysilane, and the like. Additionally, bis-[3-(triethoxysilyl)propyl]tetrasulfide, bis-[3-(triethoxysilyl)propyl] disulfide, γ-trimethoxysilylpropyldimethylthiocarbamyl tetrasulfide, γ-trimethoxysilylpropylbenzothiazyl tetrasulfide, and the like can also be used. Examples of commercially available products of these compounds include SH6062 and SZ6030 (the above manufactured by Dow Corning Toray Silicone Co., Ltd.); and KBE 903, 603, and 403 (the above manufactured by Shin-Etsu Chemical Co., Ltd.). As these silane coupling agents, γ-glycidoxypropyltrimethoxysilane, γ-methacryloxypropyltrimethoxysilane, γ-mercaptopropyltrimethoxysilane, and γ-aminopropyltrimethoxysilane are preferred from the viewpoint of adhesion strength between the coating and glass. These silane coupling agents may be used alone or in combinations of two or more types.

The content of the silane coupling agent (F) is preferably 0.01% to 2% by mass, more preferably 0.1% to 1.5% by mass, and particularly preferably 0.5% to 1.5% by mass relative to the total amount of the radiation polymerizable composition from the viewpoint of maintaining adhesion strength between the cured product and the glass fiber.

In one embodiment, aside from the above-mentioned components, various types of additives may be blended as needed, such as antioxidants, colorants, ultraviolet absorbers, photostabilizers, thermal polymerization inhibitors, leveling agents, surfactants, storage stabilizers, plasticizers, lubricants, solvents, fillers, anti-aging agents, wettability-improving agents, and coating surface-improving agents.

Examples of antioxidants include Irganox 1010, 1035, 1076, and 1222 (the above manufactured by BASF Japan Ltd.); and Antigene P and 3C and Sumilizer GA-80 and GP (manufactured by Sumitomo Chemical Co., Ltd.). Examples of ultraviolet absorbers include TINUVIN P, 234, 320, 326, 327, 328, 329, and 213 (the above manufactured by BASF Japan Ltd.); and SEESORB 102, 103, 501, 202, 712, and 704 (the above manufactured by Shipro Kasei Kaisha, Ltd.). Examples of photostabilizers include TINUVIN 292, 144, and 622 LD, and Sanol LS-770 and 765 (the above manufactured by BASF Japan Ltd.); and TM-061 (manufactured by Sumitomo Chemical Co., Ltd.).

Additionally, although the surfactants are not particularly limited, fatty acid ester-based non-ionic surfactants are preferable for effectively suppressing the occurrence of defects when the optical fiber strands are immersed in hot water. Non-ionic surfactants such as glycerin fatty acid esters, sorbitan fatty acid esters, polyoxyethylene sorbitan fatty acid esters, and polyoxysorbitol fatty acid esters are particularly preferred.

In one embodiment, other oligomers and polymers, other additives, and the like may be optionally blended into the radiation curable resin composition within a range that does not hinder the effects of the invention.

Examples of other oligomers and polymers include polyester (meth)acrylate, epoxy (meth)acrylate, polyamide (meth)acrylate, siloxane polymers comprising (meth)acryloyloxy groups, and glycidyl methacrylate.

The production method for the radiation curable resin composition is not particularly limited, and can be performed by melt-blending the components in a conventionally known reaction vessel equipped with a stirrer.

The viscosity of the radiation curable resin composition is preferably 0.1 to 10 Pa·s, more preferably 1 to 8 Pa·s, at 25° C. from the viewpoints of handling ability and applicability.

With the radiation curable resin composition, the curing rate by irradiation with radiation can be improved more than in the case of conventional compositions. The curing rate of the radiation curable resin composition can be evaluated by using the rate of increase in the Young's modulus as an index.

In one embodiment, the curing rate of the radiation curable resin composition can be evaluated by the ratio of the Young's modulus of a test film cured by irradiation with radiation at an energy dose of 0.02 J/cm$^2$ to the Young's modulus of a test film cured at an energy dose of 1.00 J/cm$^2$ at 25° C., or the ratio of the Young's modulus of a test film cured by irradiation with radiation at an energy dose of 0.03 J/cm$^2$ to the Young's modulus of a test film cured at an energy dose of 1.00 J/cm$^2$ at 25° C.

In other words, the curing rate of the radiation curable resin composition can be evaluated by using one or both of formulas (A) and (B) below.

$$\text{Curing Rate } (\%) = Y_{0.02}/Y_{1.00} \quad \text{(A)}$$

$$\text{Curing Rate } (\%) = Y_{0.03}/Y_{1.00} \quad \text{(B)}$$

In the above-mentioned formulas, $Y_{0.02}$ is the Young's modulus of a film cured by irradiation with radiation at an energy dose of 0.02 J/cm$^2$ at 25° C., $Y_{0.03}$ is the Young's modulus of a film cured by irradiation with radiation at an energy dose of 0.03 J/cm$^2$ at 25° C., and $Y_{1.00}$ is the Young's modulus of a film cured by irradiation with radiation at an energy dose of 1.00 J/cm$^2$ at 25° C.

The curing rate of the radiation curable resin composition is preferably such that the curing rate evaluated by the above-mentioned formula (A) is 0.45 or more. If the curing rate evaluated by formula (A) is 0.45 or more, then a primary coating layer of an optical fiber can be formed with higher productivity than with conventional compositions. The curing rate evaluated by formula (A) is more preferably 0.50 or more and even more preferably 0.60 or more.

The curing rate of the radiation curable resin composition is preferably such that the curing rate evaluated by the above-mentioned formula (B) is 0.60 or more. If the curing rate evaluated by formula (B) is 0.60 or more, then a primary coating layer of an optical fiber can be formed with higher productivity than with conventional compositions. The curing rate evaluated by formula (B) is more preferably 0.65 or more and even more preferably 0.70 or more.

Not intending to be bound by theory, it is believed that component (A) has a slower reaction rate than that of the constituent components of conventional resin compositions. However, in non-limiting examples, radiation curable resin compositions comprising components (A) to (C) surprisingly exhibited an increase in curing rate by irradiation with radiation, regardless of the reaction rate. Not intending to be bound by theory, it is contemplated that it is possible to constitute a network structure formed by crosslinking faster than was conventionally possible by combining and using component (A) comprising the structure represented by formula (I) and component (B).

The above-mentioned radiation curable resin composition has a faster curing rate by irradiation with radiation than that of conventional resin compositions and can form a cured product having flexibility. Thus, the above-mentioned radiation curable resin composition can be favorably used as a primary material for forming a primary coating layer of an optical fiber.

A primary material comprising the radiation curable resin composition has a fast curing rate by irradiation with radiation, making it possible to produce optical fibers with high productivity.

A cured layer formed from the radiation curable resin composition has a low Young's modulus that is favorable for use as a primary coating layer of an optical fiber. The Young's modulus of the cured product of the radiation curable resin composition is preferably 0.1 to 0.9 MPa at 25° C. from the viewpoint of being able to be used favorably as a primary coating layer of an optical fiber. If the Young's modulus of a cured layer formed from the radiation curable resin composition is 0.1 to 0.9 MPa at 25° C., then so-called microbending, in which the glass fiber becomes bent when localized pressure is applied to the optical fiber, can be prevented. The Young's modulus of the cured layer of the radiation curable resin composition is more preferably 0.2 to 0.9 MPa and even more preferably 0.3 to 0.85 MPa.

An optical fiber comprising a cured layer of the radiation curable resin composition is provided with the cured layer of the radiation curable resin composition as a primary coating layer on the surface of a glass fiber. The optical fiber preferably comprises a secondary coating layer having a Young's modulus of 1,000 MPa or more, preferably 1,000 to 2,000 MPa, contacting the outside of the primary coating layer. A glass fiber provided with a primary coating layer and a secondary coating layer, in this order, on the surface thereof can be used as an optical fiber strand.

The method for producing the optical fiber comprises disposing a radiation polymerizable composition on at least part of a surface of a glass fiber, and curing the radiation polymerizable composition by radiation irradiation, wherein the radiation polymerizable composition comprises the above-mentioned radiation polymerizable composition.

The method for disposing the radiation polymerizable composition on at least part of the surface of a glass fiber is not limited, and may involve applying a radiation polymerizable composition to the surface of the glass fiber, immersing the glass fiber in a radiation polymerizable composition, and the like, in accordance with a conventionally known method.

The method for curing the aforementioned radiation polymerizable composition by radiation irradiation is not limited, and involves irradiating a radiation polymerizable composition with one or more types of radiation selected from infrared rays, visible light rays, ultraviolet rays, X-rays, electron beams, α-rays, β-rays, γ-rays, and the like.

The production of an optical fiber generally involves applying a primary material and a secondary material while thermally melting and drawing a melted quartz preform, and radiation-curing the materials to form a primary coating layer and a secondary coating layer.

An optical fiber assembly is an assembly comprising two or more optical fibers comprising cured layers of the above-mentioned radiation curable resin composition, and may be formed into a tape-shaped optical fiber or an optical fiber cable in which the optical fibers are fixed together with a binding material.

EXAMPLES

The present invention shall be described in more detail by referring to the examples below, but the present invention is not to be construed as being limited by these examples.

Synthesis of Urethane Oligomer

Synthesis Example 1

Synthesis of Urethane Oligomer [VBA-TDI-(PPG3000-TDI)$_n$-VBA]

A reaction vessel equipped with a stirrer was charged with 886.98 g of polypropylene glycol ("EXENOL 3020", manufactured by AGC Inc.) having a number average molecular weight of 3,000, 74.35 g of 2,4-tolylene diisocyanate, and 0.24 g of 2,6-di-t-butyl-p-cresol. The mixture was heated while stirring until the liquid temperature reached 40° C. The molar ratio of polypropylene glycol to 2,4-tolylene diisocyanate was 2:3. After adding 0.27 g of dibutyltin dilaurate, the mixture was gradually heated to 55° C. over the course of 15 minutes while stirring. Then, the mixture was stirred for 30 minutes at 60° C. and allowed to react. Thereafter, 38.16 g of vinylbenzyl alcohol (manufactured by Toray Fine Chemicals Co., Ltd.; half-and-half mixture of 3-vinylbenzyl alcohol and 4-vinylbenzyl alcohol) was added. The mixture was allowed to react for two hours at 70° C. while stirring. The obtained urethane oligomer has the structure represented by formula (1) below.

$$\text{VBA-TDI-(PPG3000-TDI)}_{2.0}\text{-VBA} \tag{1}$$

wherein PPG3000 is a structural unit derived from polypropylene glycol having a number average molecular weight of 3,000, TDI is a structural unit derived from 2,4-tolylene diisocyanate, and VBA is a structural unit derived from vinylbenzyl alcohol. All of the "—" bonds are urethane bonds.

Comparative Synthesis Example 1

Synthesis of Urethane Oligomer [HEA-TDI-(PPG3000-TDI)$_n$-HEA]

A urethane oligomer was obtained using the same method as in Synthesis Example 1, except that 33.22 g of 2-hydroxyethyl acrylate was used instead of vinylbenzyl alcohol. The amount of raw material added in accordance with the value of the repetition number n and the molar ratio of polypropylene glycol to 2,4-tolylene diisocyanate are shown in Table 1. The obtained urethane oligomer has the structure represented by formula (2) below.

$$\text{HEA-TDI-(PPG3000-TDI)}_{2.0}\text{-HEA} \tag{2}$$

wherein PPG3000 is a structural unit derived from polypropylene glycol having a number average molecular weight of 3,000, TDI is a structural unit derived from 2,4-tolylene diisocyanate, and HEA is a structural unit derived from 2-hydroxyethyl acrylate. All of the "—" bonds are urethane bonds.

Synthesis Example 2

Synthesis of Urethane Oligomer [VBA-TDI-(PPG3000-TDI)$_n$-ethylhexanol]

A reaction vessel equipped with a stirrer was charged with 887.47 g of polypropylene glycol ("Exenol 3020", manufactured by AGC Inc.) having a number average molecular weight of 3,000, 74.39 g of 2,4-tolylene diisocyanate, and 0.24 g of 2,6-di-t-butyl-p-cresol. The mixture was heated while stirring until the liquid temperature reached 40° C. The molar ratio of polypropylene glycol to 2,4-tolylene diisocyanate was 2:3. After adding 0.27 g of dibutyltin dilaurate, the mixture was gradually heated to 55° C. over the course of 15 minutes while stirring. Then, the mixture was stirred for 30 minutes at 60° C. and allowed to react. Thereafter, 19.09 g of vinylbenzyl alcohol (manufactured by Toray Fine Chemicals Co., Ltd.; half-and-half mixture of 3-vinylbenzyl alcohol and 4-vinylbenzyl alcohol) was added. The mixture was allowed to react for two hours at 70° C. while stirring. Furthermore, 18.54 g of 2-ethylhexanol was added and the mixture was allowed to react for two hours at 70° C. The obtained urethane oligomer has the structure represented by formula (3) below.

$$\text{VBA-TDI-(PPG3000-TDI)}_{2.0}\text{-ethylhexanol} \tag{3}$$

wherein PPG3000 is a structural unit derived from polypropylene glycol having a number average molecular weight of 3,000, TDI is a structural unit derived from 2,4-tolylene diisocyanate, VBA is a structural unit derived from vinylbenzyl alcohol, and ethylhexanol is a structural unit derived from 2-ethylhexanol. All of the "—" bonds are urethane bonds.

Synthesis Example 3

Synthesis of Urethane Oligomer [VBA-TDI-(PPG3000-TDI)$_n$-methanol]

A urethane oligomer was obtained using the same method as in Synthesis Example 2, except that 4.63 g of methanol was used instead of 2-ethylhexanol. The amount of raw material added in accordance with the value of the repetition number n and the molar ratio of polypropylene glycol to 2,4-tolylene diisocyanate are shown in Table 1. The obtained urethane oligomer has the structure represented by formula (4) below.

$$\text{VBA-TDI-(PPG3000-TDI)}_{2.0}\text{-methanol} \tag{4}$$

wherein PPG3000 is a structural unit derived from polypropylene glycol having a number average molecular weight of 3,000, TDI is a structural unit derived from 2,4-tolylene diisocyanate, VBA is a structural unit derived from vinylbenzyl alcohol, and methanol is a structural unit derived from methanol. All of the "—" bonds are urethane bonds.

Comparative Synthesis Example 2

Synthesis of Urethane Oligomer [HEA-TDI-(PPG3000-TDI)$_n$-ethylhexanol]

A urethane oligomer was obtained using the same method as in Synthesis Example 2, except that 16.58 g of 2-hydroxyethyl acrylate was used instead of vinylbenzyl alcohol. The amount of raw material added in accordance with the value of the repetition number n and the molar ratio of polypropylene glycol to 2,4-tolylene diisocyanate are shown in Table 1. The obtained urethane oligomer has the structure represented by formula (5) below.

$$\text{HEA-TDI-(PPG3000-TDI)}_{2.0}\text{-ethylhexanol} \tag{5}$$

wherein PPG3000 is a structural unit derived from polypropylene glycol having a number average molecular weight of 3,000, TDI is a structural unit derived from 2,4-tolylene diisocyanate, and HEA is a structural unit derived from 2-hydroxyethyl acrylate. All of the "—" bonds are urethane bonds.

TABLE 1

| | Urethane Oligomer | Diol PPG3000 (g) | Diisocyanate TDI (g) | Molar Ratio PPG3000:TDI | Number of Repetitions (n) | VBA (g) | HEA (g) | Ethylhexanol (g) | Methanol (g) |
|---|---|---|---|---|---|---|---|---|---|
| Synthesis Example 1 | VBA-TDI-(PPG3000-TDI)$_{2.0}$-VBA | 886.98 | 74.35 | 2:3 | 2.0 | 38.16 | | | |
| Synthesis Example 2 | VBA-TDI-(PPG3000-TDI)$_{2.0}$-ethylhexanol | 887.47 | 74.39 | 2:3 | 2.0 | 19.09 | | 18.54 | |
| Synthesis Example 3 | VBA-TDI-(PPG3000-TDI)$_{2.0}$-methanol | 900.06 | 75.44 | 2:3 | 2.0 | 19.36 | | | 4.63 |
| Comparative Synthesis Example 1 | HEA-TDI-(PPG3000-TDI)$_{2.0}$-HEA | 891.55 | 74.73 | 2:3 | 2.0 | | 33.22 | | |
| Comparative Synthesis Example 2 | HEA-TDI-(PPG3000-TDI)$_{2.0}$-ethylhexanol | 889.75 | 74.58 | 2:3 | 2.0 | | 16.58 | 18.59 | |

Production of Radiation Polymerizable Composition

Among the materials used for the production of a radiation polymerizable composition, the following materials other than urethane oligomers were used.

Component (B)
MA: maleic anhydride
CHMI: N-cyclohexylmaleimide
PMI: N-phenylmaleimide
Component (C)
TPO-X: 2,4,6-trimethylbenzoyldiphenylphosphine oxide (Lucirin TPO-X, manufactured by BASF)
Component (D)
2-phenoxyethyl acrylate

Examples 1 to 9 and Comparative Examples 1 to 6

By using a reaction vessel equipped with a stirrer and melt-blending the constituent components for 30 minutes at 60° C., the resin compositions of the examples and comparative examples were obtained. The composition of each resin composition is shown in Table 2.

Measurement and Evaluation

Young's Modulus

The Young's modulus after curing of the resin compositions obtained in the examples and comparative examples was measured. A glass plate was coated with a resin composition using an applicator bar having a thickness of 354

μm and cured in air by irradiation with ultraviolet rays with a light intensity of 200 mW/cm² and a belt speed of 3.3 m/min so as to achieve an energy dose of 1.00 J/cm² to obtain a test film (1). A metal halide lamp (manufactured by ORC Manufacturing Co., Ltd.) was used for the ultraviolet ray irradiation.

The light intensity and the energy dose were measured using an industrial UV checker UVPF-A1: the light receiving part PD-365 (manufactured by Eye Graphics Co., Ltd.), and the belt speed was determined to be the aforementioned value so as to achieve the aforementioned energy dose.

Similarly, a resin composition was cured by irradiation with ultraviolet rays with a light intensity of 150 mW/cm² and a belt speed of 11.0 m/min so as to achieve an energy dose of 0.02 J/cm² to obtain a test film (2).

Furthermore, a resin composition was cured by irradiation with ultraviolet rays with a light intensity of 150 mW/cm² and a belt speed of 7.3 m/min so as to achieve an energy dose of 0.03 J/cm² to obtain a test film (3).

Strip-like samples having a width of 6 mm and a length of 25 mm were created from each of the three types of cured films. For each strip-like sample, tensile testing was performed in compliance with JIS K7127 at a temperature of 23° C. and a humidity of 50% using tensile tester 5542 (manufactured by Instron Corp.). The Young's modulus was determined from the tensile strength at a pulling speed of 1 mm/min and a strain of 2.5%. The results are shown in Table 2.

Curing Rate

The ratio of the Young's modulus of the test film (2) to the Young's modulus of the test film (1) was calculated using the formula below, and the curing rate of the compositions was evaluated. The results are shown in Table 2.

Curing Rate (%)=$Y_{0.02}/Y_{1.00}$ wherein $Y_{0.02}$ is the Young's modulus of the film cured by irradiation with ultraviolet rays with a light intensity of 150 mW/cm² and a belt speed of 11.0 m/min so as to achieve an energy dose of 0.02 J/cm², and $Y_{1.00}$ is the Young's modulus of the film cured by irradiation with ultraviolet rays with a light intensity of 200 mW/cm² and a belt speed of 3.3 m/min so as to achieve an energy dose of 1.00 J/cm².

Similarly, the ratio of the Young's modulus of the test film (3) to the Young's modulus of the test film (1) was calculated using the formula below, and the curing rate of the compositions was evaluated.

Curing Rate (%)=$Y_{0.03}/Y_{1.00}$ wherein $Y_{0.03}$ is the Young's modulus of the film cured by irradiation with ultraviolet rays with a light intensity of 150 mW/cm² and a belt speed of 7.3 m/min so as to achieve an energy dose of 0.03 J/cm², and $Y_{1.00}$ is the Young's modulus of the film cured by irradiation with ultraviolet rays with a light intensity of 200 mW/cm² and a belt speed of 3.3 m/min so as to achieve an energy dose of 1.00 J/cm².

TABLE 2

| Component | | Example 1 | Example 2 | Example 3 | Example 4 | Example 5 | Example 6 |
|---|---|---|---|---|---|---|---|
| (A) | VBA-TDI-(PPG3000-TDI)$_{2.0}$-VBA | 37.5 | 37.5 | 37.5 | | 37.5 | 37.5 |
| | VBA-TDI-(PPG3000-TDI)$_{2.0}$-2-ethylhexanol | 37.5 | 37.5 | 37.5 | 37.5 | | |
| | VBA-TDI-(PPG3000-TDI)$_{2.0}$-methanol | | | | | | 37.5 |
| | HEA-TDI-(PPG3000-TDI)$_{2.0}$-HEA | | | | 37.5 | | |
| | HEA-TDI-(PPG3000-TDI)$_{2.0}$-2-ethylhexanol | | | | | 37.5 | |
| (B) | MA | 4.8 | | | | | |
| | CHMI | | 5.6 | 8.4 | 8.4 | 8.4 | 8.4 |
| | PMI | | | | | | |
| (C) | TPO-X | 2 | 2 | 2 | 2 | 2 | 2 |
| (D) | Phenoxyethyl acrylate | 18.2 | 17.4 | 14.6 | 14.6 | 14.6 | 14.6 |
| | Total | 100 | 100 | 100 | 100 | 100 | 100 |
| Young's Modulus (MPa) | @ 1.00 J/cm², 23° C. | 0.86 | 0.83 | 0.90 | 0.82 | 0.87 | 0.91 |
| | @ 0.02 J/cm², 23° C. | 0.46 | 0.53 | 0.65 | 0.47 | 0.56 | 0.66 |
| | @ 0.03 J/cm², 23° C. | 0.53 | 0.64 | 0.71 | 0.55 | 0.64 | 0.71 |
| Curing Rate | 0.02 (J/cm²)/1.00 (J/cm²) Young's Modulus | 0.53 | 0.64 | 0.72 | 0.57 | 0.64 | 0.73 |
| | 0.03 (J/cm²)/1.00 (J/cm²) Young's Modulus | 0.62 | 0.77 | 0.79 | 0.67 | 0.74 | 0.78 |

| Component | | Example 7 | Example 8 | Example 9 | Comparative Example 1 | Comparative Example 2 |
|---|---|---|---|---|---|---|
| (A) | VBA-TDI-(PPG3000-TDI)$_{2.0}$-VBA | 37.5 | 37.5 | 37.5 | | 37.5 |
| | VBA-TDI-(PPG3000-TDI)$_{2.0}$-2-ethylhexanol | 37.5 | 37.5 | 37.5 | | 37.5 |
| | VBA-TDI-(PPG3000-TDI)$_{2.0}$-methanol | | | | | |
| | HEA-TDI-(PPG3000-TDI)$_{2.0}$-HEA | | | | 37.5 | |
| | HEA-TDI-(PPG3000-TDI)$_{2.0}$-2-ethylhexanol | | | | 37.5 | |
| (B) | MA | | | | | |
| | CHMI | | | | | |
| | PMI | 2.7 | 5.4 | 8.1 | | |
| (C) | TPO-X | 2 | 2 | 2 | 2 | 2 |
| (D) | Phenoxyethyl acrylate | 20.3 | 17.6 | 14.9 | 23 | 23 |
| | Total | 100 | 100 | 100 | 100 | 100 |
| Young's Modulus (MPa) | @ 1.00 J/cm², 23° C. | 0.79 | 0.89 | 1.08 | 0.79 | 0.52 |
| | @ 0.02 J/cm², 23° C. | 0.47 | 0.66 | 0.62 | 0.29 | (uncured) |
| | @ 0.03 J/cm², 23° C. | 0.58 | 0.72 | 0.75 | 0.42 | |
| Curing Rate | 0.02 (J/cm²)/1.00 (J/cm²) Young's Modulus | 0.59 | 0.74 | 0.57 | 0.37 | — |
| | 0.03 (J/cm²)/1.00 (J/cm²) Young's Modulus | 0.73 | 0.81 | 0.69 | 0.53 | — |

TABLE 2-continued

Young's Modulus

| Component | | Comparative Example 3 | Comparative Example 4 | Comparative Example 5 | Comparative Example 6 |
|---|---|---|---|---|---|
| (A) | VBA-TDI-(PPG3000-TDI)$_{2.0}$-VBA | | | | |
| | VBA-TDI-(PPG3000-TDI)$_{2.0}$-2-ethylhexanol | | | | |
| | VBA-TDI-(PPG3000-TDI)$_{2.0}$-methanol | | | | |
| | HEA-TDI-(PPG3000-TDI)$_{2.0}$-HEA | 37.5 | 37.5 | 37.5 | 37.5 |
| | HEA-TDI-(PPG3000-TDI)$_{2.0}$-2-ethylhexanol | 37.5 | 37.5 | 37.5 | 37.5 |
| (B) | MA | 4.8 | | | |
| | CHMI | | 8.4 | | |
| | PMI | | | 2.7 | 8.1 |
| (C) | TPO-X | 2 | 2 | 2 | 2 |
| (D) | Phenoxyethyl acrylate | 18.2 | 14.6 | 20.3 | 14.9 |
| | Total | 100 | 100 | 100 | 100 |
| Young's Modulus (MPa) | @ 1.00 J/cm$^2$, 23° C. | 0.80 | 0.87 | 0.82 | 1.06 |
| | @ 0.02 J/cm$^2$, 23° C. | 0.01 | 0.38 | 0.31 | 0.17 |
| | @ 0.03 J/cm$^2$, 23° C. | 0.03 | 0.51 | 0.41 | 0.37 |
| Curing Rate | 0.02 (J/cm$^2$)/1.00 (J/cm$^2$) Young's Modulus | 0.01 | 0.44 | 0.38 | 0.16 |
| | 0.03 (J/cm$^2$)/1.00 (J/cm$^2$) Young's Modulus | 0.04 | 0.59 | 0.50 | 0.35 |

Content Unit: Mass %

Table 2 indicates that the resin compositions of the examples have a Young's modulus that is suitable as a primary material of an optical fiber and have a faster curing rate by irradiation with radiation than that of conventional resin compositions.

The invention claimed is:

1. A radiation polymerizable composition for forming a primary coating layer of an optical fiber, the radiation polymerizable composition comprising:

(A) a urethane oligomer comprising a structure represented by formula (I) below:

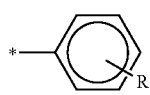
(I)

wherein R is a vinyl group and * is a bond;

(B) one or more compounds of:
 (i) maleic anhydride,
 (ii) a compound represented by formula (II) below:

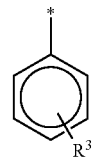
(II)

wherein $R^1$ is a single bond or an alkanediyl group comprising 1 to 6 carbon atoms, and $R^2$ is a hydrogen atom, a hydroxy group, or a group represented by formula (II-1) or formula (II-2) below:

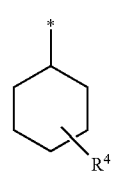
(II-1)

wherein $R^3$ is a hydrogen atom, an amino group, a carboxy group, a hydroxy group, an alkyl group, or an alkoxy group, and * is a bond, and

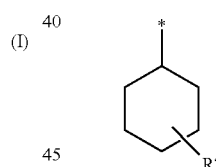
(II-2)

wherein $R^4$ is a hydrogen atom, an amino group, a carboxy group, a hydroxy group, an alkyl group, or an alkoxy group, and * is a bond, or (iii) a compound represented by formula (III) below:

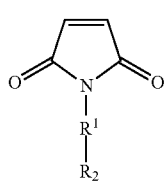
(III)

wherein $R^5$ is an alkanediyl group comprising 1 to 6 carbon atoms; and (C) a radiation polymerization initiator.

2. The radiation polymerizable composition according to claim 1, wherein:

the urethane oligomer (A) comprises the structure represented by formula (I) as part of the structure represented by formula (I-1) below:

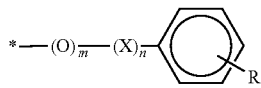

(I-1)

wherein R is a vinyl group, X is an alkanediyl group comprising 1 to 6 carbon atoms, n is an integer of 0 or 1, m is an integer of 0 or 1, and * is a bond.

3. The radiation polymerizable composition according to claim 1, wherein the urethane oligomer (A) comprises the structure represented by formula (I) at at least one terminal of the main chain.

4. The radiation polymerizable composition according to claim 1, wherein the urethane oligomer (A) comprises a urethane oligomer comprising the structure represented by formula (I) at both terminals of the main chain, and a urethane oligomer comprising the structure represented by formula (I) at one terminal of the main chain and comprising an aliphatic alkoxy group comprising 1 to 10 carbon atoms at the other terminal of the main chain.

5. The radiation polymerizable composition according to claim 1, wherein the urethane oligomer (A) comprises a 2 vinylphenoxy group, a 3-vinylphenoxy group, a 4-vinylphenoxy group, a 3-vinylbenzyloxy group, a 4 vinylbenzyloxy group, or a combination thereof.

6. The radiation polymerizable composition according to claim 1, wherein component (B) comprises a compound represented by formula (II-3) below:

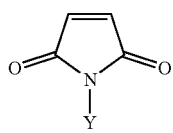

(II-3)

wherein Y is represented by one or more of the formulas below:

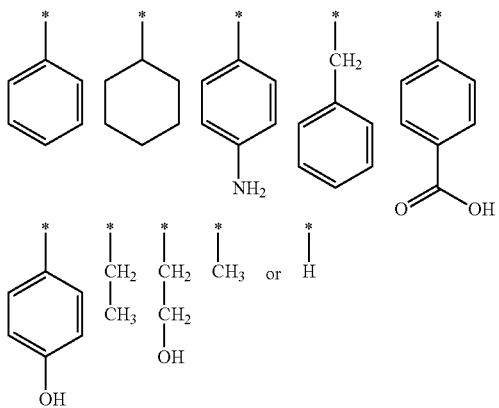

wherein * is a bond.

7. The radiation polymerizable composition according to claim 1, wherein component (B) comprises a compound represented by one of the formulas below:

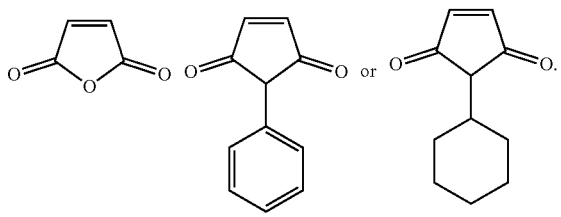

8. The radiation polymerizable composition according to claim 1, wherein component (B) comprises a compound represented by formula (II-4) below:

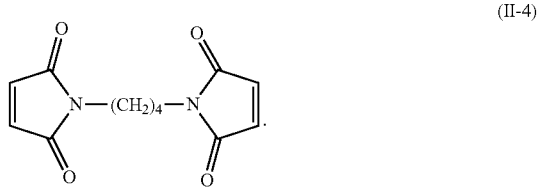

(II-4)

9. The radiation polymerizable composition according to claim 1, wherein:
the content of component (A) is 5% to 95% by mass relative to the total amount of the radiation polymerizable composition;
the content of component (B) is 0.1% to 30% by mass, relative to the total amount of the radiation polymerizable composition; and
the content of component (C) is 0.1% to 10% by mass relative to the total amount of the radiation polymerizable composition.

10. The radiation polymerizable composition according to claim 1, further comprising (D) a compound other than component (A) and comprising one ethylenically unsaturated group.

11. The radiation polymerizable composition according to claim 10, wherein component (D) comprises phenoxyethyl (meth)acrylate, 2-ethylhexyl (meth)acrylate, N-vinylcaprolactam, isobornyl (meth)acrylate, acryloylmorpholine, or a combination thereof.

12. The radiation polymerizable composition according to claim 10, wherein the content of component (D) is 3% to 45% by mass relative to the total amount of the radiation polymerizable composition.

13. A cured layer of the radiation polymerizable composition according to claim 1.

14. An optical fiber comprising the cured layer according to claim 13.

15. An optical fiber assembly comprising two or more optical fibers according to claim 14.

16. A primary coating layer of an optical fiber, the primary coating layer being formed from a radiation polymerizable composition comprising:
(A) a urethane oligomer comprising a structure represented by formula (I) below:

(I)

wherein R is a vinyl group and * is a bond;

(B) one or more compounds of:
(i) maleic anhydride,
(ii) a compound represented by formula (II) below:

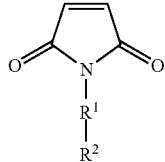
(II)

wherein $R^1$ is a single bond or an alkanediyl group comprising 1 to 6 carbon atoms, and
$R^2$ is a hydrogen atom, a hydroxy group, or a group represented by formula (II-1) or formula (II-2) below:

(II-1)

wherein $R^3$ is a hydrogen atom, an amino group, a carboxy group, a hydroxy group, an alkyl group, or an alkoxy group, and * is a bond, and

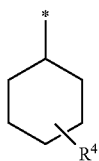
(II-2)

wherein $R^4$ is a hydrogen atom, an amino group, a carboxy group, a hydroxy group, an alkyl group, or an alkoxy group, and * is a bond, or
(iii) a compound represented by formula (III) below:

(III)

wherein $R^5$ is an alkanediyl group comprising 1 to 6 carbon atoms; and
(C) a radiation polymerization initiator.
17. A method for producing an optical fiber comprising a primary coating layer, comprising:
disposing a radiation polymerizable composition on at least part of a surface of a glass fiber; and
curing the radiation polymerizable composition by radiation irradiation, wherein the radiation polymerizable composition comprises:

(A) a urethane oligomer comprising a structure represented by formula (I) below:

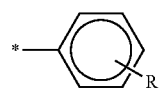
(I)

wherein R is a vinyl group and * is a bond;
(B) one or more compounds of:
(i) maleic anhydride,
(ii) a compound represented by formula (II) below:

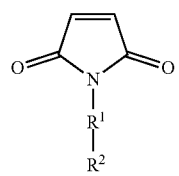
(II)

wherein $R^1$ is a single bond or an alkanediyl group comprising 1 to 6 carbon atoms, and
$R^2$ is a hydrogen atom, a hydroxy group, or a group represented by formula (II-1) or formula (II-2) below:

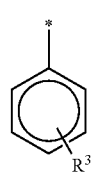
(II-1)

wherein $R^3$ is a hydrogen atom, an amino group, a carboxy group, a hydroxy group, an alkyl group, or an alkoxy group, and * is a bond, and

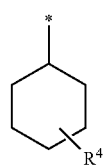
(II-2)

wherein $R^4$ is a hydrogen atom, an amino group, a carboxy group, a hydroxy group, an alkyl group, or an alkoxy group, and * is a bond, or (iii) a compound represented by formula (III) below:

(III)

wherein $R^5$ is an alkanediyl group comprising 1 to 6 carbon atoms; and (C) a radiation polymerization initiator.

\* \* \* \* \*